No. 688,152. Patented Dec. 3, 1901.
L. ATWOOD.
DRYING APPARATUS.
(Application filed Apr. 2, 1900.)
(No Model.) 2 Sheets—Sheet 2.
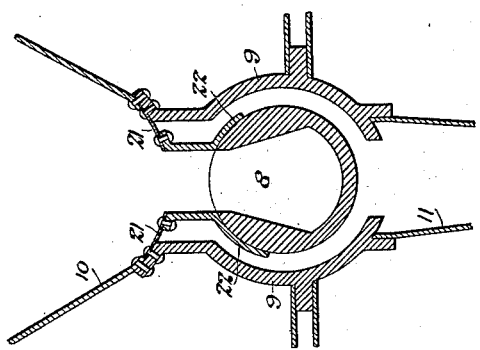
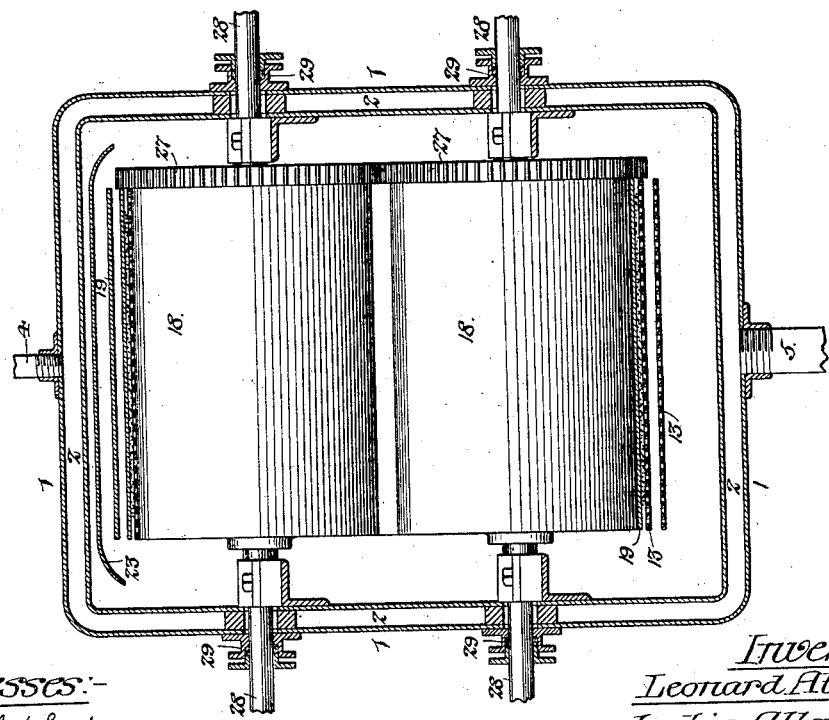
Witnesses:—
Frank L. A. Graham
Louis M. F. Whitehead
Inventor:—
Leonard Atwood
by his Attorneys

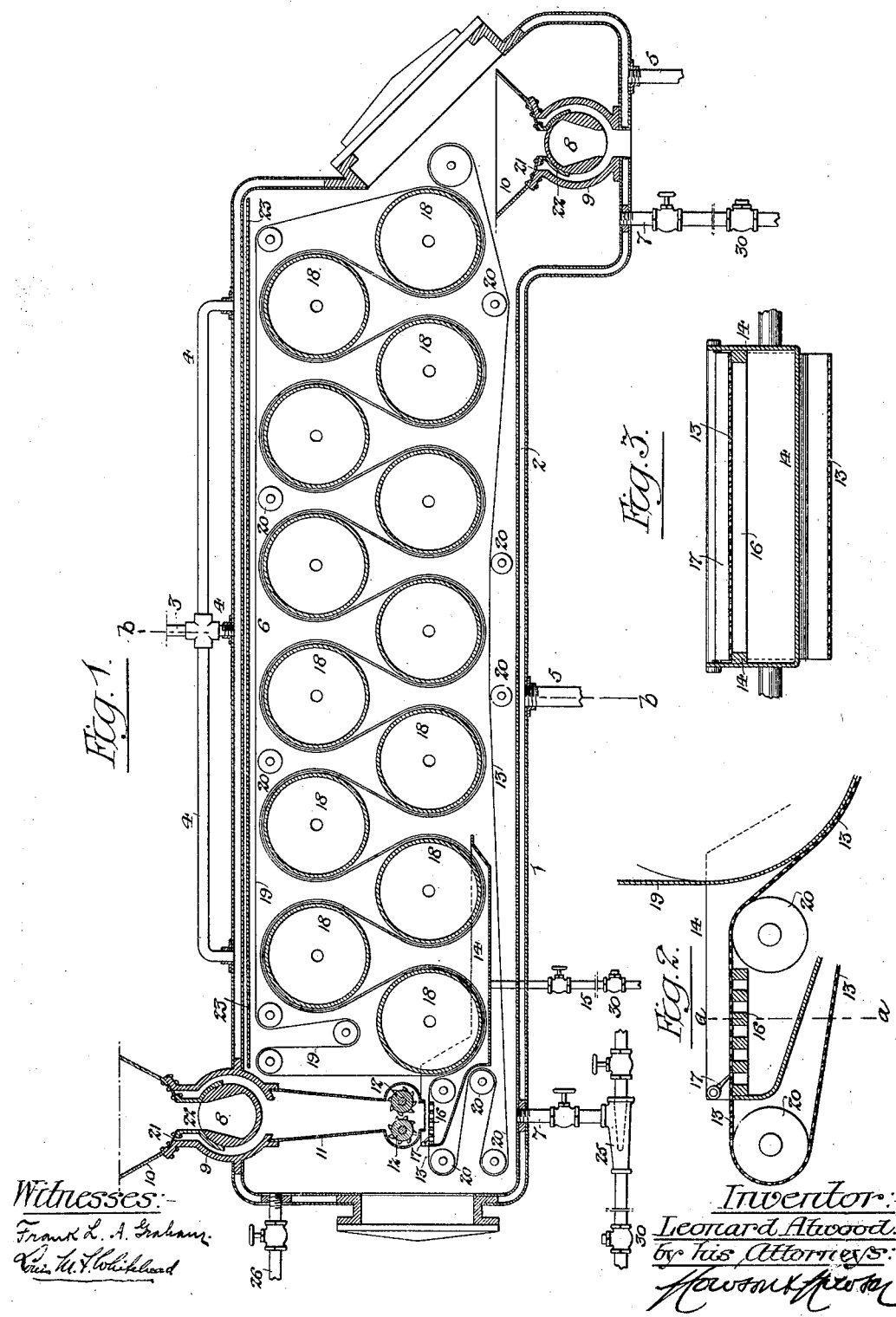

UNITED STATES PATENT OFFICE.

LEONARD ATWOOD, OF PHILADELPHIA, PENNSYLVANIA.

DRYING APPARATUS.

SPECIFICATION forming part of Letters Patent No. 688,152, dated December 3, 1901.

Application filed April 2, 1900. Serial No. 11,200. (No model.)

*To all whom it may concern:*

Be it known that I, LEONARD ATWOOD, a citizen of the United States, residing in Philadelphia, Pennsylvania, have invented certain Improvements in Drying Apparatus, of which the following is a specification.

My invention relates to that class of drying apparatus in which the drying is effected in a chamber wherein a partial vacuum is maintained, the main object of my invention being to so construct such apparatus that the partial vacuum can be produced and maintained more readily than usual and the apparatus operated with less delay and inconvenience.

My invention in its broader embodiments applies generally to apparatus of the class mentioned; but in the accompanying drawings I have shown the invention as embodied in apparatus for drying brewers' grains, several special features of my invention being present in apparatus of this character.

In the drawings, Figure 1 is a longitudinal sectional view of the apparatus. Fig. 2 is an enlarged section of part of the same. Fig. 3 is a transverse section on the line $a\,a$, Fig. 2. Fig. 4 is an enlarged transverse section on the line $b\,b$, Fig. 1; and Fig. 5 is an enlarged sectional view of one of the feed or discharge elements of the machine.

The drying of brewers' grains in such a manner as to retain in the dried grains a large percentage of the gluten and other valuable food constitutents has proven to be extremely difficult in practice, any attempt to express the water from the mass of grains by pressure as a preliminary step in the drying operation causing a large percentage of such constituents to escape with the expressed water. I find, however, that by allowing the water to drain from the grains or by subjecting them to but a moderate degree of compression, while at the same time they are being gradually dried by heat, I am enabled to effect the thorough drying of the grains and at the same time retain therein a very high percentage of the gluten and other valuable food constituents heretofore lost. The apparatus shown in the drawings and intended for the accomplishment of this purpose consists of a double-walled casing 1, the chamber 2 between the walls being a water-chamber and being supplied with cold water through a pipe 3, having branches 4, the water being withdrawn from the chamber 2 through pipes 5, or the flow may, if desired, be the reverse of this, the pipes 5 being inlet-pipes and the pipe 3 an outlet. The chamber 6 within the casing is the vacuum-chamber, partial vacuum being maintained therein by connecting said chamber through pipes 7 with an ejector air-pump or other form of exhausting apparatus 25, the feeding of the grains into the chamber 6 and their discharge therefrom being effected by means of devices which at the same time constitute traps for preventing the inflow of air at either the inlet or outlet. Each "trap-feeder" or "trap-discharger" consists, preferably, of a pocketed drum 8, turning loosely in a casing 9, upon which is supported, by means of an elastic plate 21, a segmental shoe 22, which fits snugly to the drum 8 and has in it an opening through which the grains can pass, said opening forming the discharge-neck of a hopper 10, which is mounted upon the casing 9. By this means a snug fit of the drum and shoe is always maintained irrespective of the expansion and contraction of the casing 9, the shoe, owing to the plate 21, always having a yielding or elastic bearing upon the drum. The pocket in the drum 8 and the wings of the shoe 22 are so formed that the mouth of the pocket will be cut off from communication with the hopper before said pocket begins to communicate with the chamber 6, and vice versa. Hence the pocket may be filled with grains, and as the drum is turned the pocket will dump its load of grains without offering any opportunity for the inflow of air.

The feeder-drum 8 discharges into a chute 11, at the bottom of which are a pair of toothed feed-rolls 12, rotated at such speed that they will discharge uniformly from the chute the masses of grains intermittently dumped into the same. From the chute the grains fall onto an endless belt or apron 13, of wire-gauze, perforated plate, or other material, which will permit of the draining away of the water in the mass, this water being received in a pan 14, from which it is withdrawn through a drain-pipe 15. Immediately beneath that portion of the endless apron 13 onto which the grains fall from the chute 11 is a transverse grating 16, extending from side to side of the pan 14 and serving to support the apron against the weight of the grains, which is considerable, as said grains are sodden with water. The sides of the pan 14 extend above the endless apron 13, so as to prevent the lateral escape of water from the latter except into the pan, and a pivoted flap 17, hung to the sides of the pan, bears upon the apron at the outer end of the pan in order to prevent the escape of water in that direction. The apron 13 passes around a series of hollow steam-heated drying-drums 18, contained in the chamber 6, and around these drums also passes another endless apron 19, of felt or other permeable material, these aprons traveling in the directions indicated by the arrows, so that the mass of grains deposited upon the apron 13 is carried around the cylinders 18 in succession and during such passage is confined between the aprons 13 and 19. The drums are by preference geared together by spur-wheels 27, Fig. 4, so that the entire series may be driven at the same surface speed by power applied to one of them, and the pipes 28 for the supply of steam to the drums and for the discharge of the water of condensation therefrom pass through stuffing-boxes 29 on the sides of the casing, as shown in Fig. 4. The length of the aprons 13 and 19 is such that the mass of grains confined between them is subjected to but little pressure, the water being permitted to drain naturally therefrom or being caused to escape in the form of vapor due to the heat of the drums. The pan 14 preferably extends beneath the first few drums of the series in order to receive the water from the grains during that part of their travel in which said water drains freely therefrom. As the grains gradually become freed from moisture the apron 19 dries and shrinks, thereby reducing its length and causing it to approach more closely to the reticulated apron 13. Hence as there is a shrinkage in the volume of the mass of grains, due to the drying of the same, there is a corresponding contraction in the space between the two aprons, so that the grains are properly confined and held close to the drying-drums until in a fully-dried condition they reach the point of discharge. Both aprons may be of the character of the apron 19, if desired, although it is preferable to employ for one of the aprons a reticulated metal fabric, because of its greater permeability. Suitable rollers 20 provide for the proper guidance and support of the return-runs of the aprons 13 and 19.

Extending throughout the length of the chamber 6 above the series of heated drying-drums 18 is a deflector-plate 23, which is somewhat less in width than the said chamber 6, so that vapor can rise or water of condensation can descend between the edges of said deflector-plate and the side walls of the chamber. Hence the water due to condensation of vapor by contact with the water-jacket at the top of the chamber 6 is prevented from falling back upon the drying-cylinders and aprons and is directed to the opposite sides of the chamber.

One of the main features of my invention is the water-jacket provided for the drying-chamber, and this, as before indicated, may be used in connection with many forms of drying apparatus in which the drying operation is effected by the application of heat in a chamber wherein a partial vacuum is maintained.

Among the advantages arising from the use of the water-jacket may be mentioned the readiness with which the partial vacuum within the drying-chamber may be produced and maintained. To produce the vacuum, the air may first be driven from the chamber 6 by an inflow of live steam through a suitable valved pipe 26, and the air-outlet and steam-inlet being then closed the steam within the chamber will be rapidly condensed by contact with the cool jacket and the desired degree of vacuum thereby quickly attained, the exhausting device being then set in operation in order to maintain it. The duty of the exhausting device in thus maintaining the vacuum is materially lessened by the fact that the vapor arising from the drying material is condensed by contact with the jacketed walls of the drying-chamber, and impairment of the vacuum by leakage of air into the chamber 6 is also prevented by the water-jacket for the following reason. Deformation of the casing of the apparatus to some extent naturally follows from the external pressure thereupon when a partial vacuum is produced in the chamber 6, and this leads to a straining and loosening of the joints, which while sufficient to permit a flow of air through them will not permit a like flow of water. Hence the latter acts in the nature of a seal to prevent such inflow of air. Further than this, the water-jacket keeps the casing of the apparatus so cool that the attendants can work close to the same without inconvenience, the apparatus causing no material rise in the temperature of the room or apartment in which it is placed, and the jacket also provides a means for readily cooling the chamber 6 when for any reason it is desired to enter the same.

The ejector-pipe may be provided with a check-valve 30, opening outward, and the drain-pipes 7 and 15 may be long enough to carry water-columns of a height commensurate with the degree of vacuum maintained, and each of these pipes may also be provided at the foot of the column with similar check-valves, whereby when a partial vacuum is once produced in the chamber 6 it may be retained indefinitely. As results of this construction time is saved in starting the apparatus after a temporary stoppage and collapse of any of the drying-cylinders is prevented in the event of the formation of a partial vacuum therein by condensation of the steam used for heating the same. In some cases the valved water-column drain-pipe may be the only means relied upon to maintain the vacuum in the chamber 6, water escaping through the valve at the bottom of the column as water of condensation is added at the top, so as to maintain the column in equilibrium.

The various advantages noted must, it will be evident, lessen the expense and inconvenience of operating the apparatus and otherwise tend to increase the commercial practicability of the same.

Having thus described my invention, I claim and desire to secure by Letters Patent—

1. The combination in a drying apparatus, of a jacketed casing inclosing a drying-chamber, means for supplying water to said jacket, means for heating the chamber, and means for producing a partial vacuum therein, substantially as described.

2. The combination in a drying apparatus, of a jacketed casing, inclosing a drying-chamber, means for supplying cold water to said jacket, heating means within the chamber, means for producing a partial vacuum therein, and means for conveying material to be dried through the chamber, substantially as described.

3. The combination in a drying apparatus, of a jacketed casing inclosing a drying-chamber, means for supplying cold water to said jacket, a series of drums within the chamber, means for rotating said drums, means for supplying heat thereto, and means for producing a partial vacuum in the chamber, substantially as described.

4. The combination in a drying apparatus, of a water-jacketed casing inclosing a drying-chamber, heated drums in said chamber, a pair of carrying-aprons passing around said drums wholly within the chamber, and inlet and discharge mechanism for the material, substantially as described.

5. The combination in a drying apparatus, of a double casing inclosing the drying-chamber and forming a jacket at the top and bottom and on each side of the chamber, means for supplying cold water to the jacket, means for supplying heat to the chamber, and means for conveying material therethrough, substantially as described.

6. The combination in a feeding device, of a pocketed drum, a casing free from contact therewith, and a shoe bearing upon said drum, and having an elastic support on the casing and an opening for the passage of the material, substantially as specified.

7. Drying apparatus comprising a water-jacketed casing containing the drying-chamber, heated drums within said chamber, a pair of permeable aprons passing around said drums, means for producing and maintaining a partial vacuum within the drying-chamber, provision for receiving the material to be dried between the aprons and for delivering it therefrom, and trap feed and discharge devices for the material, substantially as specified.

8. Drying apparatus comprising a series of heated drying-drums, a pair of aprons passing around said drums, and a feeding device for the material to be dried, said feeding device comprising means for delivering masses of material intermittently, and supplementary means for continuously delivering in smaller quantity the masses thus intermittently fed, substantially as specified.

9. Drying apparatus comprising a series of heated drying-drums, a pair or aprons passing around said drums, one of said aprons being perforated, means for delivering the material to be dried onto said perforated apron, a drip-pan extending beneath said apron and having sides projecting above the same, and a pivoted flap bearing upon the apron and extending from side to side of the pan, substantially as specified.

In testimony whereof I have signed my name to this specification in the presence of two subscribing witnesses.

LEONARD ATWOOD.

Witnesses:
F. E. BECHTOLD,
JOS. H. KLEIN.